(12) United States Patent
Ek et al.

(10) Patent No.: US 8,079,747 B2
(45) Date of Patent: Dec. 20, 2011

(54) COUNTER-ROTATING TWIN SCREW EXTRUDER

(75) Inventors: Carl-Gustaf Ek, Vastra Frolunca (SE);
Yutaka Mizutani, Hiroshima (JP);
Takayuki Yamazawa, Hiroshima (JP);
Junichi Iwai, Hiroshima (JP); Shigeki Inoue, Hiroshima (JP); Arne Syre, Strathelle (NO); Jari Aarila, Porvoc (FI)

(73) Assignees: Borealis Technology Oy, Porvoo (FI);
Japan Steel Works, Ltd., Hiroshima (JP)

( * ) Notice: Subject to any disclaimer, the term of this patent is extended or adjusted under 35 U.S.C. 154(b) by 0 days.

(21) Appl. No.: 13/070,625

(22) Filed: Mar. 24, 2011

(65) Prior Publication Data

US 2011/0170369 A1    Jul. 14, 2011

Related U.S. Application Data

(62) Division of application No. 11/988,647, filed as application No. PCT/EP2005/007555 on Jul. 12, 2005, now abandoned.

(51) Int. Cl.
*B29B 7/46* (2006.01)

(52) U.S. Cl. ................ 366/80; 366/81; 366/84

(58) Field of Classification Search ........... 366/79–91, 366/96–99, 297–301; 425/200–209
See application file for complete search history.

(56) References Cited

U.S. PATENT DOCUMENTS

| | | | | |
|---|---|---|---|---|
| 3,070,836 A * | 1/1963 | De Haven et al. | | 264/40.7 |
| 3,360,824 A * | 1/1968 | Schippers | | 366/76.92 |
| 3,419,250 A * | 12/1968 | Brennan, Jr. | | 366/196 |
| 3,565,403 A * | 2/1971 | Matsuoka | | 366/84 |
| 3,661,363 A * | 5/1972 | Aletti | | 366/149 |
| 3,700,374 A * | 10/1972 | Matsuoka et al. | | 366/77 |
| 3,764,118 A * | 10/1973 | Matsuoka | | 366/84 |
| 3,802,670 A * | 4/1974 | Okada et al. | | 366/77 |
| 3,829,067 A * | 8/1974 | Matsuoka | | 366/81 |
| 3,869,111 A * | 3/1975 | Matsuoka | | 366/77 |
| 3,870,285 A * | 3/1975 | Bausch et al. | | 366/80 |
| 3,923,291 A * | 12/1975 | Matsuoka et al. | | 366/77 |
| 3,981,658 A * | 9/1976 | Briggs | | 425/205 |
| 4,025,058 A * | 5/1977 | Mizuguchi | | 366/76.1 |
| 4,103,355 A * | 7/1978 | Weber | | 366/90 |
| 4,136,968 A * | 1/1979 | Todd | | 366/85 |
| 4,310,251 A * | 1/1982 | Scharer et al. | | 366/77 |

(Continued)

FOREIGN PATENT DOCUMENTS

EP    1048433 A3    1/2001

(Continued)

*Primary Examiner* — Charles E Cooley
(74) *Attorney, Agent, or Firm* — Milbank, Tweed, Hadley & McCloy LLP

(57) ABSTRACT

A screw extruder having a body forming a chamber of two barrels housing two counter-rotating axis-parallel rotors, a supply port for the material to be mixed in the chamber at one end of the body, a discharge port for discharging the mixed material at the other end of the body, a conveying section with screws for feeding the material from the supply port downstream to a mixing section which comprises at least two mixing zones, each mixing zone having at least one forward-conveying wing and at least one backward-conveying wing downstream of the forward-conveying wing on each rotor characterized in that a throttle valve is provided in the chamber downstream of the mixing section, and downstream of the throttle valve a second conveying section with screws and a second mixing section are provided.

11 Claims, 2 Drawing Sheets

U.S. PATENT DOCUMENTS

| | | | |
|---|---|---|---|
| 4,332,481 A * | 6/1982 | Inoue et al. | 366/84 |
| 4,380,397 A * | 4/1983 | Hashizume et al. | 366/77 |
| 4,462,691 A * | 7/1984 | Boguslawski | 366/80 |
| 4,542,992 A | 9/1985 | Markhart | 366/300 |
| 4,678,339 A * | 7/1987 | Peiffer et al. | 366/76.93 |
| 4,681,457 A * | 7/1987 | Orimo et al. | 366/84 |
| 4,707,139 A * | 11/1987 | Valenzky et al. | 366/77 |
| 4,744,669 A * | 5/1988 | Kowalczyk et al. | 366/77 |
| 4,752,135 A * | 6/1988 | Loomans | 366/85 |
| 4,752,139 A * | 6/1988 | Hauck | 366/298 |
| 4,776,784 A * | 10/1988 | Batiuk | 425/203 |
| 4,826,323 A * | 5/1989 | Loomans et al. | 366/85 |
| 5,145,251 A * | 9/1992 | Shirato et al. | 366/80 |
| 5,180,225 A * | 1/1993 | Piccolo et al. | 366/147 |
| RE34,172 E * | 2/1993 | Gwinn et al. | 366/85 |
| 5,259,671 A * | 11/1993 | Lowe et al. | 366/83 |
| 5,273,356 A * | 12/1993 | Piccolo et al. | 366/84 |
| 5,335,991 A * | 8/1994 | Wobbe | 366/79 |
| 5,382,089 A * | 1/1995 | Mosher | 366/83 |
| 5,487,602 A * | 1/1996 | Valsamis et al. | 366/81 |
| 5,494,965 A | 2/1996 | Harlin et al. | 525/52 |
| 5,593,227 A * | 1/1997 | Scheuring et al. | 366/82 |
| 5,672,005 A * | 9/1997 | Fukui et al. | 366/75 |
| 5,855,432 A * | 1/1999 | Inoue et al. | 366/322 |
| 5,863,117 A * | 1/1999 | Gheorghita | 366/85 |
| 5,909,958 A * | 6/1999 | Rauwendaal | 366/76.2 |
| 6,068,466 A * | 5/2000 | Morita | 425/203 |
| 6,179,459 B1* | 1/2001 | Kobayashi et al. | 366/77 |
| 6,238,079 B1* | 5/2001 | Watada et al. | 366/80 |
| 6,280,074 B1* | 8/2001 | Kuroda et al. | 366/76.3 |
| 6,386,748 B1* | 5/2002 | Huber et al. | 366/79 |
| 6,390,666 B1* | 5/2002 | Schafer et al. | 366/331 |
| 6,409,373 B1* | 6/2002 | Tanaka et al. | 366/84 |
| 6,607,299 B1* | 8/2003 | Bacher et al. | 366/87 |
| 7,004,616 B2* | 2/2006 | Murakami et al. | 366/75 |
| 7,097,345 B2* | 8/2006 | Ueda et al. | 366/147 |
| 7,350,960 B2* | 4/2008 | Ziegenfus et al. | 366/88 |
| 7,419,295 B2* | 9/2008 | Inoue et al. | 366/75 |
| 7,566,163 B2* | 7/2009 | Inoue | 366/81 |
| 7,637,650 B2* | 12/2009 | Ueda et al. | 366/77 |
| 7,802,915 B2* | 9/2010 | Yamada et al. | 366/80 |
| 2004/0257903 A1* | 12/2004 | Ueda et al. | 366/77 |
| 2006/0007777 A1* | 1/2006 | Ziegenfus et al. | 366/88 |
| 2007/0109911 A1* | 5/2007 | Neubauer | 366/77 |
| 2007/0237022 A1* | 10/2007 | Wiltz et al. | 366/80 |
| 2007/0237850 A1* | 10/2007 | Wiltz et al. | 425/114 |
| 2009/0122636 A1* | 5/2009 | Yamane et al. | 366/76.93 |
| 2009/0175120 A1* | 7/2009 | Rokey et al. | 366/132 |
| 2009/0213681 A1* | 8/2009 | Ek et al. | 366/76.1 |
| 2011/0085408 A1* | 4/2011 | Neubauer | 366/77 |

FOREIGN PATENT DOCUMENTS

| | | | |
|---|---|---|---|
| EP | 1048433 B1 | | 10/2002 |
| JP | 5631433 | | 3/1981 |
| JP | 5636633 | | 10/1981 |
| JP | 56136632 A | * | 10/1981 |
| JP | 56136633 A | * | 10/1981 |
| JP | 02099305 A | * | 4/1990 |
| JP | 02120006 A | * | 5/1990 |
| JP | 02263609 A | * | 10/1990 |
| JP | 04014412 A | * | 1/1992 |
| JP | 04022606 A | * | 1/1992 |
| JP | 04022607 A | * | 1/1992 |
| JP | 04156932 A | * | 5/1992 |
| JP | 06047734 A | * | 2/1994 |
| JP | 10235636 A | * | 9/1998 |
| JP | 10305422 A | * | 11/1998 |
| JP | 2000309017 A | * | 11/2000 |
| WO | 9815591 | | 4/1998 |
| WO | 9951649 | | 10/1999 |
| WO | 0001765 | | 1/2000 |
| WO | 0022040 | | 4/2000 |
| WO | 0114122 | | 3/2001 |
| WO | 02063345 A2 | | 8/2002 |
| WO | 02063345 A3 | | 9/2002 |
| WO | 03047839 A1 | | 6/2003 |
| WO | 2004101674 A1 | | 11/2004 |

* cited by examiner

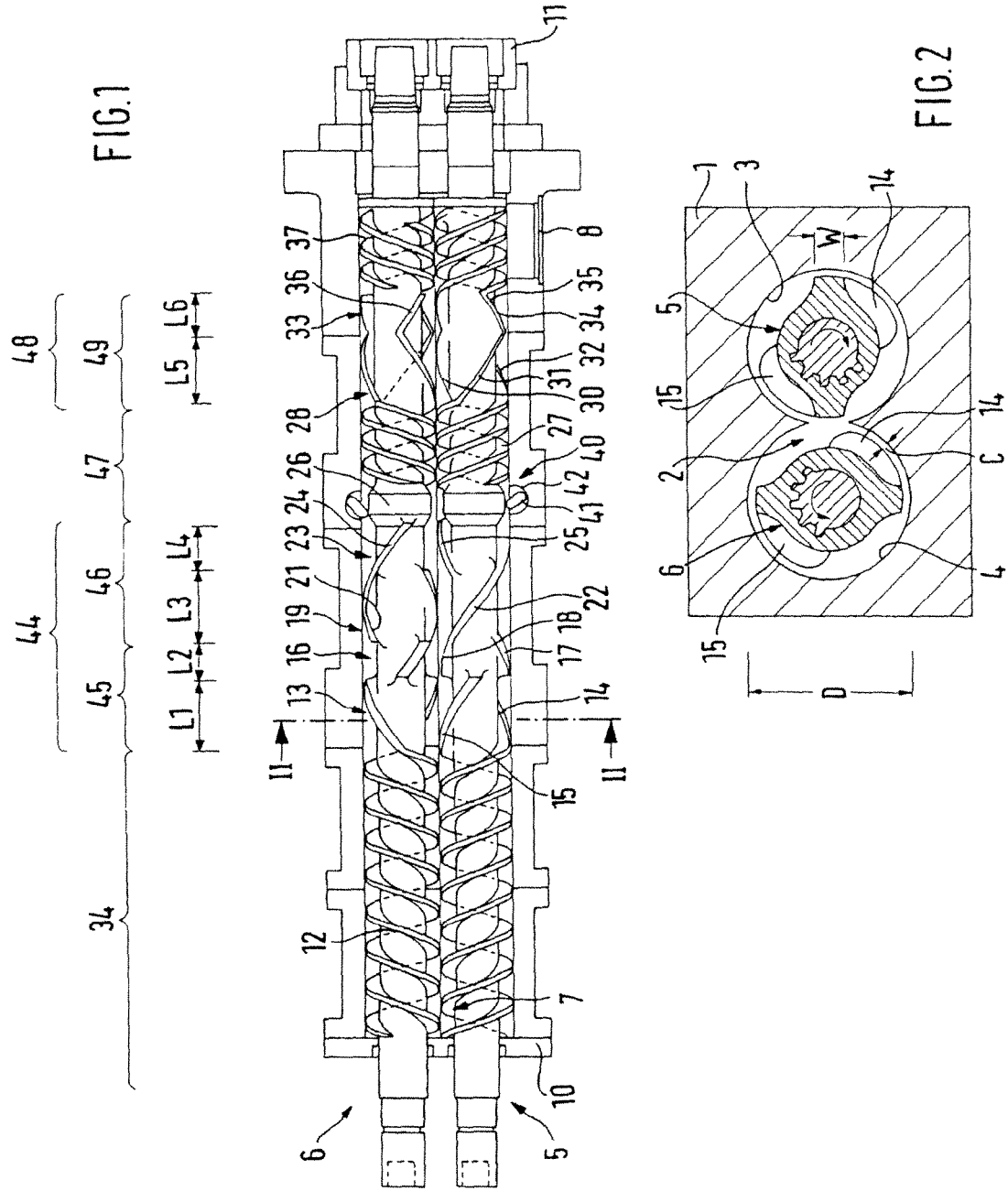

COUNTER-ROTATING TWIN SCREW EXTRUDER

This application is a Divisional Application of U.S. application Ser. No. 11/988,647, filed on May 7, 2009, now abandoned, which was a National Stage Application under 35 U.S.C. 371 of PCT/EP2005/007555, filed on Jul. 12, 2005, the disclosures of which are incorporated by reference herein in their entireties.

The invention relates to a counter-rotating twin screw extruder for compounding polymers.

When producing a polymer composition, the ingredients thereof, as different polymers, fillers and additives, as antioxidants, light stabilizers, etc., have to be mixed intimately in order to obtain a composition as homogenous as possible. This is done by compounding the ingredients in a compounding machine as a to counter-rotating twin-screw extruder.

While on one hand, the compounding should be carried out at a high temperature and shearing rate in order to achieve a homogenous composition, degradation of the polymers is caused by too severe conditions.

Particular problems are encountered when compounding multimodal polymers, as multimodal polyethylene materials. Multimodal polymers are in many respects superior to corresponding mono-modal materials. Multimodal polyethylene materials and, more particularly, bimodal polyethylene materials have a widespread and increasing use as materials for various applications as pipes, wires and cables, films, blow-molded and injection-molded articles, etc.

Multimodal polymer compositions such as bimodal polyethylene materials consist of a low molecular weight polymer fraction and a high molecular weight fraction. The high molecular weight molecules are known to be most sensitive to the compounding conditions needed to achieve the desired degree of homogenization.

For instance, undispersed domains of high molecular weight molecules appear as white spots in colored materials. The white spots may adversely affect the strength of the article. Further, when compounding polymer compositions, e.g. for the production of a film, gel particles appear as disfiguring spots in the finished film which consist of high molecular weight polymer not adequately compounded. Although compounding at higher temperatures and shear rates may remove the white spots and gel particles, degradation of the high molecular weight molecules may occur which negatively effects the otherwise superior properties of the multimodal polymer material.

Thus, the white spots and gel particles are a serious problem in the polymer industry and a solution of the problem would mean the removal of a serious obstacle to use otherwise superior multimodal polymer compositions.

In EP-A-645 232 is described a way of reducing this problem by adding liquid nitrogen or solid carbon dioxide to the polymer feed. This is, however, a rather is costly way. According to WO 98/15591, the problems may be tackled by compounding at a low shear rate so that the temperature of the polymer increases slowly. This requires a highly precise control of the process conditions of the counter-rotating twin screw extruder, however, and the production capacity is rather low.

U.S. Pat. No. 6,409,373 discloses a counter-rotating twin-screw extruder having a mixing section upstream of and a mixing section downstream of a throttle valve or gate plates, each mixing section comprising forward-conveying wings and backward-conveying wings downstream of the forward-conveying wings. Although in a monomodal polymer material the number of gels may be reduced, it is not possible to obtain multimodal polymer materials of high homogeneity without adversely affecting the superior quality of multimodal polymer materials with the known extruder.

PATENT ABSTRACTS OF JAPAN vol. 0050, no. 85 (C-057). 3 Jun. 1981-06-03) & JP 56 031433 A discloses a twin screw extruder having a throttle element between two supply sections with two supply ports, each supply section having a conveying section with screws and a mixing section.

PATENT ABSTRACTS OF JAPAN vol. 0060, no. 11 (C-088), 22 Jan. 1982 (1982-01-22) & JP 136633 A discloses a twin screw extruder according to the pre-amble of claim 1.

US-B1-6 280 074 discloses a twin screw extruder having screws with wings in the shape of "V" to form backward- and forward-conveying movements.

It is an object of the invention to obtain multimodal polymer materials of high homogeneity with a high production capacity at low cost.

On the upper side at the left end or upstream side of the extruder shown in FIG. 1 a single supply port 7, shown with a dotted line, is provided to supply all the powder polymer material to be mixed in chamber 2, since only a single supply port is provided. At the right hand or downstream side of the extruder in FIG. 1 a discharge port 8 is provided for discharging the mixed molten material into a gear pump from which it is passed through a die plate, after which it is cooled and solified and cut to pellets (not shown).

The counter-rotating twin extruder according to the invention comprises a mixing, section having at least two mixing zones, each mixing zone consisting of at least one, preferably at least two forward-conveying wings and at least one, preferably at least two backward-conveying wings downstream of the forward-conveying wings on each rotor.

The number of forward-conveying wings and the number of backward-conveying wings of each mixing zone preferably corresponds to the number of flights of the screws of the conveying section upstream of the mixing section. For instance, in each mixing zone two, three or four forward-conveying wings and backward-conveying wings, respectively, may be used.

To adjust the filling degree of the mixing section, a throttle valve or gate is usually provided between the mixing section and the discharge port of the extruder. Instead of a throttle valve, a gear pump connected to the discharge valve may be used to control the filling degree in the mixing section. As a throttle valve, a rotary slot bar may be used as disclosed in JP-A-3004647. In that solution two bars extend across the rotors which have a convex side rotating in a concave depression in the barrels, the throttle gap being defined by the distance between the rotors and the throttle edge of the bars.

The twin screw extruder of the present invention has two mixing sections, namely one upstream of the throttle valve and one downstream thereof. Whereas the first mixing section upstream of the throttle valve comprises at least two mixing zones, each mixing zone having at least two forward-conveying wings and at least two backward-conveying wings, the second mixing section downstream of the throttle valve has preferably a lower number of mixing zones, for instance only one mixing zone when the first mixing section has two mixing zones.

In the first mixing section, mainly dispersive mixing takes place, so that the particles of the powder material to be mixed are broken up, whereas in the second mixing section, mainly distributive mixing occurs. That is, in the first mixing zone of the first mixing section next to the screws of the conveying section, the polymer material starts to melt and continues to melt in the second mixing zone of the first mixing section, and then the polymer melt is charged through the throttle valve into the second mixing section. There, the melt is kneaded further to distribute the different polymers and optionally, fillers, additives and so forth homogeneously in the melt. Due to its high dispersive mixing efficiency of the at least two mixing zones of the first mixing section, the twin screw extruder of the invention is particularly effective for compounding multimodal polymer materials.

From the second mixing section, the polymer melt is discharged through the discharge port into a gear pump or a discharge extruder. From the gear pump or the discharge extruder, the melt is passed through a die plate, after which it is cooled and cut to pellets. Alternatively, the melt is discharged through a discharge port directly after the first mixing section.

Whereas the filling degree of the first mixing section is determined by the throttle valve, the filling of the second mixing section downstream of the throttle valve may be adjusted by the suction side pressure of the gear pump.

Preferably, the upstream ends of the forward-conveying wings of the first mixing zone of the first mixing section are positioned at the downstream end of the screws of the first conveying section, and it is also preferred that the upstream ends of the forward-conveying wings of the mixing zone of the second mixing section are positioned at the downstream ends of the of the screws of the second conveying section. That is, the screws of the first and second conveying sections and the forward-conveying wings of the first zone of the first mixing section and of the mixing zone of the second mixing, section, respectively, preferably are positioned to form continuous closed flights.

In the first mixing section, the downstream end of the forward-conveying wings and the upstream end of the backward-conveying winos of each mixing zone are preferably offset to form a passage for the material to be mixed. Due to these passages, a mixing action in axial direction occurs, and it is avoided that material, in particular unmelted material, is pressed between the barrels and the wings on the rotors, which would cause a deflection of the rotors resulting in a non-uniform mixing due to a non-uniform gap between the wings and the barrels.

The offset between the forward-conveying winos and the backward-conveying wings of each mixing zone usually depends on the number of flights of the screw in the conveying section. In case of two flights, the offset may be about 90° in the circumferential direction, and in case of three flights, about 60°.

In the first mixing section, the downstream ends of the forward-conveying wings and the upstream ends of the backward-conveying wings of one mixing zone and the downstream ends of the backward-conveying wings of one mixing zone and the upstream ends of the forward-conveying wings of the next mixing zone are positioned in the same radial plane, respectively. However, an axial shift of those ends is also possible, so that for instance in one mixing zone the upward ends of the backward-conveying winos are upstream of the downstream ends of the forward-conveying wings of this zone. Forming those passages between the wings is particularly preferred when the screws of the first conveying section have only two flights. In case of three flights or more, the rotor is stiffer so that the down-stream ends of the forward-conveying wings and the upstream ends of the backward conveying wings of each mixing zone may be connected to form a "V" Because the viscosity of the polymer melt is lower in the second mixing section due to higher temperature, the forward-conveying winos and the backward-conveying wings of the mixing zone of the second mixing section form such Vs. That is, the forward-conveying wings and the backward-conveying wings of the second mixing section are preferably positioned to form continuous closed flights having the shape of a "V".

The length of the forward-conveying wings is preferably longer than that of the backward-conveying wings in each mixing zone, and the length of the backward-conveying wings in the first mixing zone of the first mixing section is preferably shorter than the length of the backward-conveying wings in the mixing zone of the first mixing section downstream of the first mixing zone.

The ratio of the length (L) of the wings to the inner diameter (D) of the barrels is so preferably between 0.3 and 2.0. For instance the L/D ratio of the forward-conveying wings of both mixing sections is about 1, the L/D ratio of the backward conveying wings of the first mixing zone of the first mixing section and the second mixing section about 1/2 and the L/D ratio of the backward-conveying wings of the second mixing zone of the first mixing section is about 3/4.

The lead or pitch of the wings of the mixing sections may vary between 2 and 6D and usually all wings have the same lead. If there is different lead along the screw, then normally in each mixing zone there is the same lead.

The radial clearance of the wings of the first mixing zone of the first mixing section is preferably greater than the radial clearance of the wings of the second mixing zone of the first mixing section, and the radial clearance of the wings of the second mixing section is preferably smaller than the clearance of the conveying wings of the second mixing zone of the first mixing section. That is, the more the material melts and the lower its viscosity, the smaller is the radial clearance. Based on the inner diameter (D) of the barrels, the radial clearance may vary between 0.01 and 0.05 D. Usually, the radial clearance of the forward-conveying wings and the backward-conveying wings of one mixing zone are equal to obtain uniform balanced mixing. The tip width of the conveying wings may vary between 0.01 and 0.05 D.

Whereas the two barrels form a common chamber in which the rotors counter-rotate, no or only slight intermeshing takes place between the two rotors.

When compounding polymer with a twin screw extruder of the present invention, at a given specific energy input (SEI), the homogeneity of the product is considerably improved. Thus, the degradation of polymer chains is significantly reduced, which leads to an improvement of the optical and mechanical properties of the compounded product, especially long-term mechanical properties as slow-crack growth resistance, i.e. resistance to internal pressure, exemplified by pipe pressure testing.

In addition, the control of SEI by adjusting the throttle valve is more convenient. While the prior art rotor design may give large variation of SEI with a minor adjustment of the throttle valve in some positions of the valve, the present design gives a nearly uniform and controllable response of SEI over the whole adjustment range of the throttle valve. This makes it easier to balance between a desired homogeneity and SEI level to avoid degradation of the polymer.

The twin screw extruder of the present invention is particularly useful for compounding multimodal polymer compositions, particularly compositions comprising a low molecular weight ethylene polymer, for instance with a melt flow rate $MFR_2$ (D) of about 0.1 to 5,000 g/10 min, and a high molecular weight polymer, for instance with a $MFR_{21}$ (G) of 0.01 to 10.0 g/10 min, where $MFR_2$ (D) and $MFR_{21}$ (G) are determined according, to ISO 1133, conditions 4 and 7, respectively.

The compounded product is particularly useful for making coloured bimodal polyethylene pipe materials comprising the bimodal ethylene polymer as a base resin and the pigment, optionally as compounded into a carrier polymer in the form of a master batch. The coloured materials preferably have a high homogeneity rating of 5 or less, more preferably 3 or less, and still more preferably 2 or less, where the homogeneity is defined as the dispersion of white spots measured according to the method ISO 11420: 1996 (E) which method is normally used for evaluation of carbon black agglomerates in polyolefin pipes. Suitable pigments are, among others, carbon black, ultramarine blue and phtalocyanine blue. Of these, carbon black is especially preferred. In addition, the pipes have excellent mechanical properties and anti-sagging properties. Also high-density polvethylene films with excellent optical properties may be obtained, as well as large blow-molded articles and wire and cable products such as the slotted cores of optical cables. Said bimodal pipe materials are disclosed in WO 00/01765 and WO 00/22040, said bimodal film materials are disclosed in WO 99/51649, said bimodal blow-molding materials are disclosed in WO 01/14122 and said slotted core materials in WO 02/063345.

An embodiment of the inventive twin screw extruder will be explained in more detail below with reference to the enclosed drawing, in which:

FIG. 1 shows a longitudinal section through the extruder;

FIG. 2 shows a cross-section along the line II-II in FIG. 1; and

Figure 3:
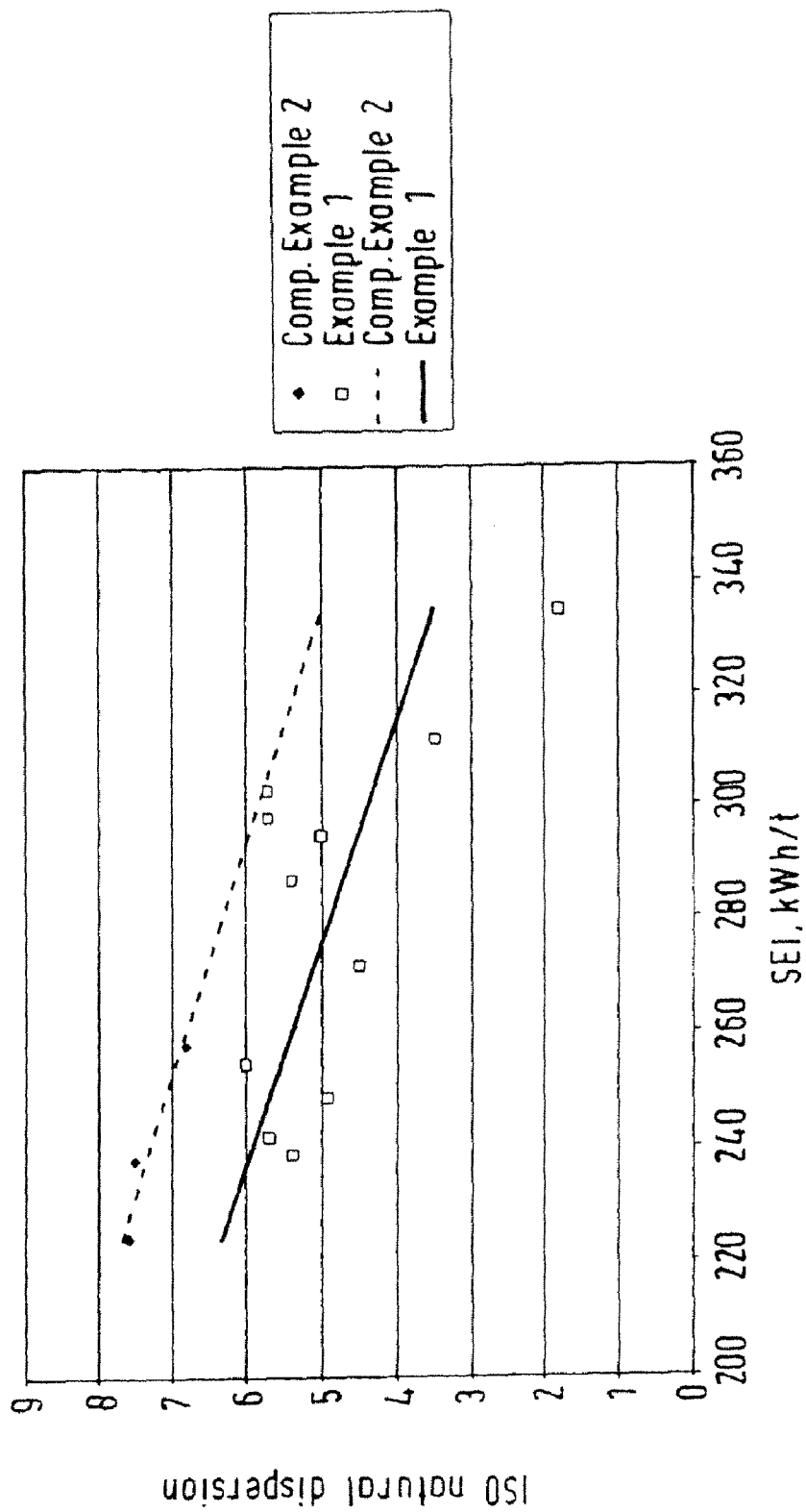
FIG. 3 shows a (graph of the dispersion as a function of specific energy input.

According to FIGS. 1 and 2, the extruder has a body 1 forming a chamber 2 comprising to cylindrical barrels 3 and 4 which communicate with each other. Each barrel 3, 4 houses a rotor 5, 6 which rotate in opposite directions as shown by the arrows in FIG. 2 and are axis-parallel.

On the upper side at the left end or upstream side of the extruder shown in FIG. 1 a supply port 7, shown with a dotted line, is provided to supply the powder material to be mixed in chamber 2. At the right hand or downstream side of the extruder in FIG. 1 a discharge port 8 is provided for discharging the mixed molten material into a gear pump from which it is passed through a die plate, after which it is cooled and solified and cut to pellets (not shown).

The two rotors 5, 6 are supported rotatably at both axial ends with bearings in end plates 10, 11 and are driven in opposite direction hr a drive not shown.

Disposed on each rotor 5, 6 are from the left to the right side in FIG. 1 screw elements 12 with two flights, elements 13 each with two forward-conveying wings 14, 15, elements 16 each with two backward-conveying wings 17, 18, elements 19 each with two forward-conveying wings 21, 22, elements 23 each with two backward-conveying wings 24, 25, ring-like throttle elements 26, screw elements 27 with three flights, elements 28 each with three forward-conveying wings 30, 31, 32, elements 33 each with three backward-conveying wings 34, 35, 36, and screw elements 37 with three flights. The elements 12, 13, 16, 19, 23, 27, 28, 33 and 37 may be fixed to the rotor shafts by splining. However, it is also possible to make the complete rotor in one piece, e.g. in forged steel.

The throttle valve 40 is formed by rotary slot bars 41 extending across the rotors 5, 6 and rotating in a semi-circular depression 42 in the barrels 3, 4.

The screw elements 12 form a first conveying section 34 for feeding the material from the supply port 7 downward to a first mixing section 44 which comprises a first mixing zone 45 and a second mixing zone 46. Each mixing zone 45, 46 has two forward-conveying wings 14, 15 and 21, 22, respectively, and two backward-conveying wings 17, 18 and 24, 25, respectively, on each rotor 5, 6.

In the first mixing section 44, mainly dispersive mixing takes place, so that the particles of the powder material to be mixed are broken up. In the first mixing section 44, the material is molten mainly due to shear forces and partly by external heating. In the first mixing zone 45, the polymer material starts to melt and continues to melt in the second mixing zone 46.

From the throttle valve 40 the molten material flows to screw elements 27 which form a second conveying section 47 and feed the molten material to a second mixing section 48 which comprises only one mixing zone 49 which has three forward-conveying wings 30, 31, 32 and three backward-conveying wings 34, 35, 36 on each rotor 5, 6. In the second mixing section 48, mainly distributive mixing occurs, that is, the melt is kneaded further to distribute the different polymers, fillers, additives and so forth homogeneously in the melt. From the second mixing section 48, the polymer melt is discharged through discharge port 8.

The upstream ends of the forward-conveying wings 14, 15 of the first mixing zone 45 of the first mixing section 44 are positioned at the downstream ends of the flights of the screws 12 of the first conveying section 34, and the upstream to ends of the forward-conveying wings 30, 31, 32 of the mixing zone 49 of the second mixing section 48 are positioned at the downstream ends of the flights of the screws 27 of the second conveying section 47.

In the first mixing section 44 in each mixing zone 45, 46, the forward-conveying wings 14, 15 and 21, 22, respectively, and the upstream ends of the backward-conveying wings 17, 18 and 24, 25, respectively, are offset with an angle of 90° in the circumferential direction, and the downstream ends of the backward-conveying wings 17, 18 of the first mixing zone 45 and the upstream ends of the forward-conveying wings 24, 25 of the second mixing zone are also offset by an angle of 90° in the circumferential direction to form a passage for the material to be mixed.

In contrast to this, the downstream ends of the forward-conveying wings 30, 31. 32 and the backward-conveying wings 34, 35, 36 of the mixing zone 49 of the second mixing section 48 are positioned to form a "V".

The axial lengths L1, L3 and L5 of the forward-conveying wings 14, 15; 21, 22; 30, 31, 32 is longer than the length L2, L4 and L6 of the backward-conveying wings 17, 18; 24, 25; 34, 35, 36. Furthermore, the length L2 of the backward-conveying wings 17, 18 in the first mixing zone 45 is shorter than the length L4 of the backward-conveying wings 24, 25 in the second mixing zone 46 of the first mixing section 44. Thus, the ratio of the length of the wings to the inner barrel diameter D is, for instance $L1/D=L3/D=L5/D=1$, $L2/D=0.5$, $L4/D=0.75$ and $L6/D=0.5$.

The lead or pitch of the wings 14, 15; 17, 18; 21, 22; 24, 25; 30, 31, 32; 34, 36 is for instance 4, and, usually, the same for all wings.

In the first mixing section 44, the radial clearance C of the wings 14, 15; 17, 18 of the first mixing zone 45 is greater than the radial clearance C of the wings 21, 22; 24, 25 in the second mixing zone 46 of the first mixing section 44. Based on the diameter D of the barrels 3, 4, the radial clearance C may vary between 0.01 and 0.05 D.

The tip width W of the wings 14, 15, 17, 18, 21, 77, 24, 25, 30, 31, 32, 34, 35, 36 may vary between 0.01 and 0.05 D.

EXAMPLE 1

The counter-rotating twin screw extruder as shown in FIG. 1 was used having a barrel diameter D of 90 mm, a length of the chamber 2 before the throttle valve 40 of 7.5 and after the throttle valve 40 of 3.5 based on the diameter D of the barrels, and equipped with a gear pump at the discharge port and a pelletizer.

The number of the wings 14, 15, 17, 18, 21, 22 and 24, 25 of the first mixing section 44 was 2, the number of the wings 30, 31, 32 and 34, 35, 36 of the mixing zone 49 of the second mixing section 48 was 3. Screws 12 had two flights and screws 27 three. The radial clearance C was 3.9 mm for the forward-conveying wings 14, 15 and backward-conveying wings 17, 18 of the first mixing zone 45, 2.0 mm for the forward-conveying wings 21, 22 and backward-conveying win 24, 25 of the second mixing, zone 46 and 1.5 mm for the forward-conveying wings 30, 31, 32 and backward-conveying wings 34, 35, 36 of the second mixing section 48. The lead was 4 for all wings and the L/D ratios were L1/D=L3/D=L5/D=1; L2/D=0.5; L4/D=0.75 and L6/D=0.5.

As polymer material bimodal polyethylene prepared according to Inventive Material C of Example 3 of WO 00/22040 was used, except that 1-butene was used as a comonomer instead of 1-hexene and the hydrogen to ethylene ratio in the loop reactor was adjusted so that the polymer produced in the loop reactor had an $MFR_2$ of 400 g/10 min. Further, the 1-butene to ethylene ratio in the gas phase reactor was adjusted so that the density of the resin was 0.951 g/cm³ and hydrogen to ethylene ratio in the gas phase reactor was adjusted so that the bimodal polymer resin had a melt index $MFR_5$ of 0.25 g/10 min and $MFR_{21}$ of 9.5 g/10 min, where $MFR_5$ and $MFR_{21}$ were determined according to ISO 1133: 1997. conditions T and G, respectively. Density was determined according to ISO 1183-1987. Into the polymer material were added about 2.3% by weight carbon black and about 0.35% of antioxidants and stabilisers. The polymer material was fed with a throughput of about 240 kg/h. The SEI was calculated on the basis of the power consumption of the drive motor. The white spots of the product were rated according to ISO 11420: 1996 (E).

COMPARATIVE EXAMPLE 2

Example 1 was repeated with an extruder having the same barrel diameter, L/D ratios, throttle valve and other equipment. However, it had only one mixing section upstream the throttle valve. The mixing section consisted of two forward-conveying wing elements followed by a backward-conveying wing element. All wing elements had 2 flights, a radial clearance of 2 mm, a lead of 4 and an L/D ratio of 1.

The same polymer material with the same throughput was used as in Example 1.

The results of Example 1 in comparison to Example 2 are shown in FIG. 3. It is evident from FIG. 3 that the inventive concept makes it possible to reach a given homogeneity level of the polymer with a lower specific energy input (SEI). This reduces the risk of degradation of the polymer and thereby a combination of good mechanical properties and good homogeneity can be achieved.

EXAMPLE 3

Example 1 was repeated with a larger extruder having a barrel diameter D of 380 mm. The throughput was 24 t/h. The polymer material and all other parameters were the same as in Example 1. The rating for the homogeneity according to the method ISO 11420: 1996 (E) was 5.2, the SEI 215 kWh/t.

COMPARATIVE EXAMPLE 4

Comparative Example 2 was repeated with a larger extruder having a barrel diameter D of 380 mm as in Example 3. All other parameters of the extruder were the same as in Comparative Example 3. The throughput and the polymer material were the same as in Example 3. The rating for the homogeneity according to ISO 11420: 1996 (E) was 7.2, the SEI 245 kWh/t.

EXAMPLE 5

Example 3 was repeated, except that another polymer was used. The polymer was prepared otherwise in a similar way than in Example 1, but the gas phase reactor conditions were adjusted so that the bimodal polymer had $MFR_5$ of 0.25 g/10 min and $MFR_{21}$ of 6.7 g/10 min.

The rating according to the method ISO 11420: 1996 (E) was 4.4; the SEI was 210 kWh/t.

EXAMPLE 6

Example 5 was repeated, except that another polymer was used. The polymer was prepared otherwise in a similar way than in Example 1, but the gas phase reactor conditions were adjusted so that the bimodal polymer had $MFR_5$ of 0.30 g/10 min and $MFR_{21}$ of 11 g/10 min. The rating according to ISO 11420:1996 to (E) was 2.9, the SEI was 195 kWh/t.

EXAMPLE 7

Example 5 was repeated, except that another polymer was used. The polymer was prepared otherwise in a similar way than in Example 1, but the gas phase reactor conditions were adjusted so that the bimodal polymer had $MFR_2$ of 0.50 g/10 min and $MFR_5$ of 2.0 g/10 min and density of 0.942 g/cm³, where $MFR_2$ and $MFR_5$ were determined according to ISO 1133:1997, conditions D and T, respectively. The rating according to ISO 11420: 1996 (E) was 1.2, the SEI was 200 kWh/t.

COMPARATIVE EXAMPLE 8 to 10

Examples 5 to 7 were repeated with the big extruder according to Comparative Example 4.

The ratings according to ISO 11420: 1996 (E) were 7.2; 4.4 and 1.6, respectively, the SEI were 240, 230 and 245 kWh/t, respectively.

What is claimed is:

1. A method for compounding a multimodal polymer composition, comprising,
   providing a body forming a chamber of two barrels housing two counter-rotating axis-parallel rotors, wherein said body has one opening for inflow and one opening for outflow of said multimodal polymer composition,
   wherein said inflow opening is a single supply port,
   supplying all of said multi modal polymer composition comprising a low molecular weight polymer and a high molecular weight polymer to said chamber through said single supply port at one end of said body,
   conveying said multimodal polymer composition through a first conveying section comprising screws on each rotor for feeding said multimodal polymer composition from said supply port downstream to a first mixing section,
   mixing said multimodal polymer composition in said first mixing section comprising at least two mixing zones for dispersive mixing of said multimodal polymer composition, each mixing zone of said first mixing section comprising on each rotor at least one forward conveying wing and at least one backward conveying wing downstream of the forward conveying wing, passing said multimodal polymer composition through a throttle valve downstream of said first mixing section, conveying said multimodal polymer composition through a second conveying section downstream of said throttle valve, said second conveying section comprising screws on each rotor, mixing said multimodal polymer composition in a second mixing section downstream of said second conveying section, said second mixing section comprising at least one mixing zone for distributive mixing of said multimodal polymer composition, said mixing zone of said second mixing section comprising on each rotor at least one forward conveying wing and at least one backward conveying wing downstream of the forward conveying wing, and discharging said multimodal polymer composition through a discharge port at the other end of said body.

2. The method of claim 1 wherein the downstream ends of the forward-conveying wings and the upstream ends of the backward-conveying wings of each mixing zone of the first mixing section are offset to form a passage for the material to be mixed.

3. The method of claim 1 wherein the downstream ends of the backward-conveying wings of the first mixing zone of said first mixing section located downstream of said first conveying section and the upstream ends of the forward-conveying wings of the mixing zone located downstream of said first mixing zone are offset to form a passage for the material to be mixed.

4. The method of claim 1 wherein the length (L2) of the backward-conveying wings in the first mixing zone of said first mixing section located downstream of said first conveying section is shorter than the length (L4) of the backward-conveying wings of the mixing zone located downstream of said first mixing zone.

5. The method of claim 1 wherein the radial clearance (C) of the wings of the first mixing zone of said first mixing section located downstream of said first conveying section is greater than the radial clearance (C) of the wings of the mixing zone located downstream of said first mixing zone.

6. The method of claim 1 wherein the forward-conveying wings and the backward conveying wings of said mixing zone of said second mixing section are positioned to form continuous flights in the shape of a "V".

7. The method of claim 1 wherein the number of the forward-conveying wings and of the backward-conveying wings of each mixing zone corresponds to the number of the flights of the screws of the conveying sections upstream of the respective mixing zone.

8. The method of claim 1 wherein the length of the forward-conveying wings of each mixing zone is longer than the length of the backward-conveying wings of said mixing zone.

9. The method of claim 1 wherein the ratio of the length of the wings to the diameter of each barrel is 0.3 to 2.0.

10. The method of claim 1 wherein the lead of the wings of said first mixing section or said second mixing section is 2 to 6 times the diameter of each barrel.

11. The method of claim 1 wherein said multimodal polymer composition comprises a low molecular weight ethylene polymer with a melt flow rate $MFR_{21}$ (D) of about 0.1 to 5,000 g/10 min and a high molecular weight polymer with a melt flow rate $MFR_{21}$ (G) of about 0.01 to 10.0 g/10 min.

* * * * *